(12) United States Patent
White et al.

(10) Patent No.: US 8,463,228 B2
(45) Date of Patent: Jun. 11, 2013

(54) SYSTEM AND METHOD FOR COMBINED HOME NETWORK COMMUNICATIONS AND BROADCAST RECEPTION IN A SETTOP BOX

(75) Inventors: David Glen White, Indianapolis, IN (US); Alexander Sarapin, Westfield, IN (US); Hutchinson Daniel Mark, Carmel, IN (US)

(73) Assignee: Thomson Licensing, Issy-les-Moulineaux (FR)

( * ) Notice: Subject to any disclaimer, the term of this patent is extended or adjusted under 35 U.S.C. 154(b) by 146 days.

(21) Appl. No.: 13/145,582

(22) PCT Filed: Dec. 17, 2009
(Under 37 CFR 1.47)

(86) PCT No.: PCT/US2009/068487
§ 371 (c)(1),
(2), (4) Date: Jul. 21, 2011

(87) PCT Pub. No.: WO2010/087913
PCT Pub. Date: Aug. 5, 2010

(65) Prior Publication Data
US 2011/0281543 A1    Nov. 17, 2011

Related U.S. Application Data

(60) Provisional application No. 61/206,392, filed on Jan. 30, 2009.

(51) Int. Cl.
*H04B 1/16*    (2006.01)
(52) U.S. Cl.
USPC ..... 455/337; 455/552.1; 455/509; 455/452.2; 455/41.1; 455/41.2; 370/328; 370/338

(58) Field of Classification Search
USPC .............. 455/337, 552.1, 509, 452.2, 41.1, 455/41.2; 370/328, 338
See application file for complete search history.

(56) References Cited

U.S. PATENT DOCUMENTS

| | | | |
|---|---|---|---|
| 6,963,623 B2 * | 11/2005 | Ninomiya et al. | 375/326 |
| 7,343,140 B2 * | 3/2008 | Hanrahan | 455/130 |
| 7,519,347 B2 * | 4/2009 | Winsvold | 455/283 |
| 7,860,529 B2 * | 12/2010 | Sathath | 455/553.1 |
| 7,929,990 B2 * | 4/2011 | Tomioka et al. | 455/552.1 |
| 8,295,877 B2 * | 10/2012 | Hui et al. | 455/552.1 |
| 2005/0190777 A1 | 9/2005 | Hess et al. | |
| 2006/0203086 A1 | 9/2006 | Pavlakovic | |
| 2011/0319016 A1 * | 12/2011 | Gormley et al. | 455/41.1 |

FOREIGN PATENT DOCUMENTS

| | | |
|---|---|---|
| JP | 2004-186920 | 7/2004 |
| KR | 10-0322050 | 2/2002 |
| KR | 10-0565942 | 3/2006 |

* cited by examiner

*Primary Examiner* — Sanh Phu
(74) *Attorney, Agent, or Firm* — Robert D. Shedd; Vincent E. Duffy; Michael A. Pugel

(57) ABSTRACT

A method and apparatus for demodulating different type of signals having at least a portion of overlapping frequency ranges is provided. The method and apparatus receives at least one a broadcast signal and a home networking signal, wherein the frequency range of the broadcast signal overlaps the frequency range of the home networking signal. The system further determines if the received signal is a broadcast signal or a home networking signal and provides the respective signal to a demodulator for demodulation.

23 Claims, 7 Drawing Sheets

SYSTEM AND METHOD FOR COMBINED HOME NETWORK COMMUNICATIONS AND BROADCAST RECEPTION IN A SETTOP BOX

CROSS-REFERENCE TO RELATED APPLICATIONS

This application claims the benefit under 35 U.S.C. §365 of International Application PCT/US2009/068487 filed Dec. 17, 2009, which was published in accordance with PCT article 21(2) on Aug. 5, 2010.

This Nonprovisional Patent Application claims priority from U.S. Provisional Application Ser. No. 61/206,392 filed on Jan. 30, 2009.

FIELD OF THE INVENTION

The present disclosure relates generally to a receiver for receiving broadcast data signals and, more specifically, to a settop box for receiving broadcast digital data and home networking signals on a common delivery medium.

BACKGROUND OF THE INVENTION

This section is intended to introduce the reader to various aspects of art, which may be related to various aspects of the present disclosure that are described below. This discussion is believed to be helpful in providing the reader with background information to facilitate a better understanding of the various aspects of the present disclosure. Accordingly, it should be understood that these statements are to be read in this light, and not as admissions of prior art.

Advanced settop boxes, such as those used for receiving terrestrial, cable or satellite signals, often include one or more of a variety of additional networking capabilities. Digital Home Networking (DUN) services are often included as a feature that allows multiple settop boxes, usually located in a single customer premise, to communicate with each other. One popular DHN protocol has been created by the Multimedia over Cable Alliance (MoCA) and involves transmitted content and control information between settop boxes using the same cabling system used to deliver the primary broadcast (i.e. cable or satellite broadcast) service. Including MoCA with the delivery of satellite based services generally requires that the frequency spectrum used for the home networking system be outside the spectrum used for the various satellite delivery systems.

However, constraints related to external operational interference or the cost and practicality of design may not permit use of spectrum outside the broadcast and distribution spectrum for the satellite signals at all times. In one particular instance, a home networking system is currently being implemented for use with satellites signals that will operate in the range of 500 Megahertz (MHz) to 600 MHz. However, the settop boxes are designed to receive satellite signals in the frequency range of 250 MHz to 2150 MHz. In order to permit use of the home networking system, a series of switches and filters may be included to separately process the home networking signal from the satellite broadcast signal. The additional circuitry adds significant cost and complexity to the system and, more importantly, unnecessarily impacts the performance of the broadcast reception of the settop box. The performance impact is primarily due to the inclusion of switches and other circuits that increase signal distortion and signal insertion loss to the broadcast signal. A system and method that addresses the problems associated with home networking communications in conjunction with broadcast communications in a settop box is desired.

SUMMARY OF THE INVENTION

A system and method is provided for receiving and transmitting home networking communications in a particular frequency spectrum in one mode of operation and receiving certain satellite signals in substantially the same frequency spectrum in another mode. The method includes receiving at least one of a broadcast signal and a home networking signal, wherein the frequency range of the broadcast signal overlaps the frequency range of the home networking signal and determining if the received signal is a broadcast signal or a home networking signal.

The method may be implemented in a settop box apparatus. The apparatus includes a diplexer that receives a signal and filters the signal to produce a portion of the received signal in a first frequency range and a portion of the received signal in a second frequency range. A switching circuit is coupled to the diplexer and receives the portion of the signal in the second frequency range. A controller is coupled to the output of the switching circuit and determines whether the portion of the signal in the second frequency range is of a first type or a second type. The switching circuit provides the portion of the signal in the second frequency range signal for demodulation based on whether the portion of the signal in the second frequency range is of a first type or a second type.

DETAILED DESCRIPTION

Figure 1:
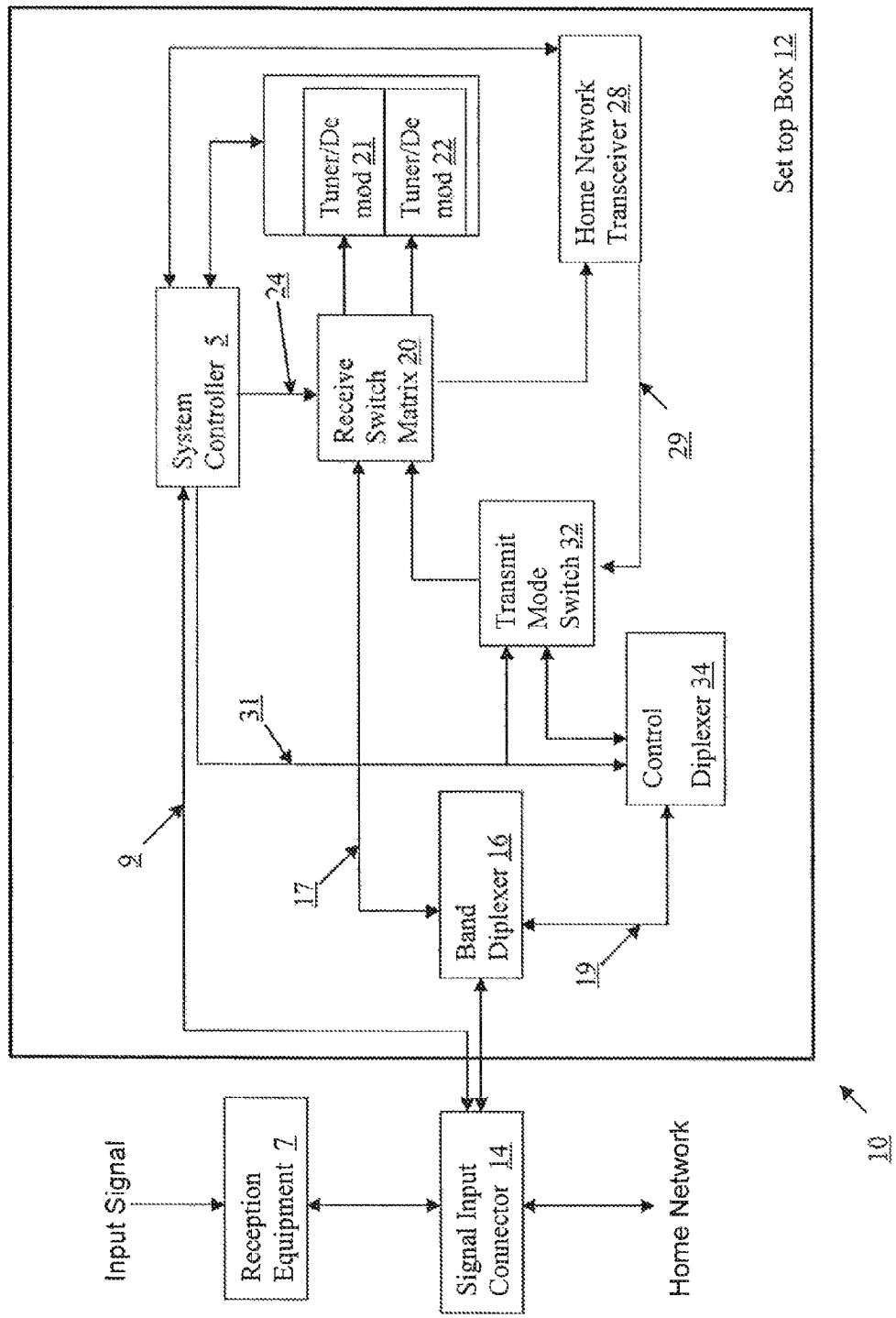
FIG. 1 is block diagram of a home communications and broadcast signal receiving system according to invention principles.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of this disclosure.

The following describes a system relating to broadcast signals, and more particularly to broadcast signals as defined for use in a satellite and/or cable signal transmission system and a home networking system. The embodiments described may be used in a settop box, television, or similar signal receiving device. Examples of similar devices include, but are not limited to, cellular phones, intelligent phones, personal digital assistants, and laptop computers. Other systems utilized to receive other types of signals may include similar structures and processes. Those of ordinary skill in the art will appreciate that the embodiments of the circuits and processes described herein are merely one set of potential embodiments. It is important to note that signals compliant with various broadcast and wireless standards in general, may be transmitted in a manner other than over a satellite or cable network, including transmission over the air, through a wireless network, or over telephone lines. As such, in alternate embodiments, the components of the system may be rearranged or omitted, or additional components may be added. For example, with minor modifications, the system described may be configured for use in other terrestrial broadcast services, wi-fi video and audio services, or phone data services, including services used elsewhere in the world.

The embodiments described below are primarily related to reception of signals. Certain aspects of the embodiments including, but not limited to, certain control signals and power supply connections have not been described or shown in the figures but may easily be ascertained by a skilled artisan. It should be noted that the embodiments may be implemented using hardware, software, or any combination of both, including the use of a microprocessor and program code or custom integrated circuits. It should also be noted that many of the embodiments involve iterative operation and connection between the various elements of the embodiment. Alternative embodiments may be possible using pipelining architectures employing repeated identical elements, connected in series, in place of, or in addition to, the iteration operation embodiments described herein.

A system and method is provided for receiving and transmitting home networking communications in a particular frequency spectrum in one mode of operation and receiving certain satellite signals in substantially the same frequency spectrum in another mode. The architecture and process implemented by the system advantageously provides thr significant cost savings and improves performance over conventional settop boxes. Content providers (i.e. cable and satellite providers) are turning to other methods of distributing content to consumers beyond conventional broadcasting of audio-video data. More specifically, content providers are taking advantage of the settop boxes in a consumer's home to create a home network.

An exemplary multi-mode content receiver system is described herein. The system advantageously enables receipt of two different types of data signals via the same input path wherein each data signal has its own respective frequency but the frequencies at least partially overlap one another. For example, the settop box adaptively routes received cable/satellite input signals having a frequency ranging between 250 MHz and 2150 MHz and a home networking signal having a frequency ranging between 400 MHz and 600 MHz (for example in accordance with the MoCA standard). The above frequency ranges set forth for the particular type of input signals are described for purposes of example only and one skilled in the art will be able to readily extend the principles of demodulating signals received on the same cable in overlapping frequency ranges to any type of data signals having overlapping frequencies. The system enables two way home networking services between a plurality of settop boxes in conjunction with the delivery of broadcast services, such as cable or satellite broadcast services, to each of the settop boxes in a customer premises. The system advantageously eliminates the interfacing issues previously associated with combining a home networking communication system with the receiver system for the broadcast service when the two systems share a common delivery medium such as a co-axial cable.

FIG. 1 shows an embodiment of a combined home communications and broadcast signal receiving system 10. The system 10 includes a receiver 12, referred to hereinafter as a settop box. The settop box 12 includes a system controller 5 that receives user input in a known manner to selectively determine the type of data being output by the settop box 12 for display. The various control signals used in controlling settop box 12 operation are processed through the system controller 5. The settop box 12 includes a connector 14 for receiving at least two input signals via a single input, for example an F-connector coupled to coaxial cable. The system controller 5 communicates a mode determination signal 9 via the connector 14 which is used to selectively determine the type of signals processed by reception equipment 7 for receipt and display by settop box 12. Reception equipment 7 is able to receive at least one of (a) broadcast data signals, for example Digital Satellite Equipment Control (DiseqC) signals and (b) broadcast signals and digital home networking signals. Reception equipment 7 includes, for example, a satellite dish and other known associated electronic circuitry for receiving any of broadcast signals or digital home networking signals in a first mode of operation, the mode determination signal 9 reports back to the system controller 5 that reception equipment 7 receives broadcast data signals and in the second mode of operation, the mode determination signal 9 reports back to the system controller 5 that the reception equipment 7 to receive both broadcast data signals and digital home networking signals. The input signal, at different times or in different modes, includes broadcast signals in the frequency range both above and below 950 MHz and the home networking signals in the frequency range below 950 MHz.

The settop box 12 includes a band diplexer 16 which filters and separates the signal input into component signals that are above and below a threshold frequency, for example 950 MHz. The band diplexer 16 is coupled to a receive switch matrix 20 and a control diplexer 34. The receive switch matrix 20, in response to a receive control signal 24, selectively routes any signal passed via the diplexer 16 to a desired tuner (21, 22) for output. The control diplexer 34 is coupled to a transmit mode switch 32 and selectively filters the signal passed from the diplexer 16 according to signal type and frequency range. The transmit mode switch 32 is selectively configured to operate in a "transmit only" mode or a "transmit/receive" mode. The control diplexer 34 and transmit mode switch 32 advantageously enable transmission of a first type of signal (i.e. broadcast signal) and a second type of signal (home networking signal) wherein the frequency range associated with each of the first and second type at least partially overlaps. The transmit mode switch 32 is also coupled to the received matrix switch 20 for selective routing any signal passed via the transmit mode switch 32 to a desired tuner (21, 22) or a networking transceiver 28.

The operational modes employed by the system 10 will be discussed hereinafter. During operation, the system 10 processes a first type of signal which is a broadcast signal (i.e. cable/satellite signal) and a second type of signal which is a home networking signal. In the first mode of operation, the input signal received at connector 14 is separated by the band diplexer 16 into a first input signal 17 when the frequency is greater than 950 MHz. The first input signal 17 having a frequency greater than 950 MHz is provided to the receive switch matrix 20. The receive switch matrix 20 adaptively determines which of the one or more tuners 21, 22 that the first input signal 17 will be provided. The receive switch matrix 20 receives a receive control signal 24 from the system controller 5 that includes information for directing how the receive switch matrix 20 routes the first input signal 17 received from the diplexer 16. The receive control signal 24 causes the receive switch matrix 20 to selectively toggle between different outputs thus directing the received signal along the correct signal path. The signal path is determined in response to user-requested data, for example broadcast content type and channel.

Also in the first mode of operation, the portion of the input signal having a frequency below 950 MHz is separated and filtered by the diplexer 16 and provided as a second input signal 19 to the control diplexer 34. The mode determination signal 9 includes data identifying that the operational mode is the first mode (i.e. broadcast data signals only). In response thereto, the system controller 5 provides a control signal 31 to the control diplexer 34 to configure the control diplexer 34 to act as a pass-through for the second input signal 19 having a frequency below 950 MHz. Additionally, the control signal 31 is provided to the transmit mode switch 32 and configures the transmit mode switch 32 to operate in a transmit only mode. In the first mode, the second input signal 19 is a first type and is provided to the control diplexer 34. The control diplexer 34 filters and separates the second input signal 19 into a first type and a second type in response to the control signal 31 provided by the system controller 5 and based on the type of reception equipment 7 is provided. The first type of second input signal 19 is provided to the transmit mode switch 32. The transmit mode switch 32, in this first mode of operation, is directed to operate in a transmission mode in response to control signal 31 identifying the second input signal 19 is of a first type. The transmit mode switch 32 provides the first type of second input signal 19 to the receive switch matrix 20 which selectively determines the signal transmission path to a particular tuner/demodulator 21, 22. The operation of the receive switch matrix 20 is controlled by the receive control signal 24 which includes data that directs the receive switch matrix 20 to assign and provide a transmission path for the first type of second input signal 19. Thus, in the first mode of operation, in the event that there are broadcast signals having portions above and below the threshold 950 MHz frequency, the receive switch matrix 20, in response to the receive control signal 24 selectively determines the path for signal transmission to the particular tuner/demodulator IC 21, 22. Thus, the switch matrix 20 is able to output broadcast signals having both low and high frequencies.

In exemplary operation, the settop box 12 controls the reception equipment 7 to ensure it provides the type of signals the set top box wants to receive. In the first mode of operation, the settop box 12 determines that it is not connected to a single wire mode (SWM Mode) enabled network (i.e. can only receive broadcast signals). This determination will be discussed hereinafter with respect to FIG. 3. In this mode, the input signal received at connector 14 is a 22 KHz DiseqC signal, and the settop box configures itself to turn off (or initiate sleep mode) the networking transceiver 28. When the system is operating in the first mode, the system controller 5 generates receive control signals 24 causing all received signals to be passed to one of the tuners 21, 22 based on channel selection information provided by the user.

For example, if the user decides to tune to a channel that requires a signal from the satellite at a location of 101 degrees, and a downconverted frequency of 974 MHz, the set top box 12 will send out a control signal to tell the reception equipment 7 (satellite dish) to select the correct satellite and the correct polarity that allows 974 MHz to be present at the F connector input. That signal is provided to the diplexer 16, and because it is above 950 MHz, the diplexer filters the signal as the first input signal 17 which is provided to the receive switch matrix 20. Since the set top box 12 is looking for 974 MHz, the system controller 5 automatically sets the switch matrix 20 to connect the first input signal to the tuner requesting it (either 20 or 21). Conversely, if a user selects an HD channel and the set top box 12 determines that the desired channel is on the satellite at a location of 103 degrees and a downconverted frequency of 550 MHz, it sends a control signal out to the tell the reception equipment 7 to select the 103 satellite, and send down the correct polarity it needs. In this case, 250-750 MHz signals are provided to the F connector 14 and, because this portion of the input signal is below 950 MHz, the diplexer 16 filters the signal and provides the filtered signal as the second input signal 19. Because the system controller 5 determines that this second input signal is of a first type, the system controller 5, via control signal 31 configures the control diplexer 34 to act as a pass-through and transmit mode switch 32 to operate in a transmit only mode. Thus, the second input signal 19 having a frequency of 550 MHz is provided to the receive switch matrix 20 for connection to the appropriate tuner 20, 21.

In a second mode of operation, the system facilitates simultaneous transmission and output of a first input signal 17 having frequencies above the threshold frequency and a second input signal 19 of a second type having a frequency below the threshold frequency. For example, the first input signal 17 may comprise a broadcast signal and the second input signal 19 may comprise a home networking signal. System controller 5 determines that the reception equipment 7 is able to operate in a SWM mode and is able to receive both broadcast and home networking signals. In SWM mode, the reception equipment receives all broadcast signals having frequencies between 250 MHz and 2150 MHz and automatically re-mixes any broadcast signals below the threshold frequency of 950 MHz to be over the 950 MHz threshold. The band diplexer 16 separates the input signal received at connector 14 into the first input signal 17 of a first type and a second input signal 19 of a second type. Therefore, in this mode of operation, if one of the signals separated by the band diplexer 16 is below the threshold frequency (i.e. 950 MHz) the signal is a home networking signal having a frequency ranging between 400 MHz and 600 MHz. The system controller 5 determines that the reception equipment is able to operate in the second mode. In response to this determination, the system controller 5 generates the control signal 31 which may be a 2.3 MHz frequency shift keying (FSK) control signal associated with a home networking signal. The control signal 31 is provided to the control diplexer 34 which filters the second input signal 19 from the control signal 31 and identifies the second input signal as being of a second type (i.e. home networking signal).

In response to determining that the system is operating in the second mode, the system controller 5 directs the DHN transceiver 28 to generate a network control signal 29. The DHN transceiver 28 controls the transmit mode switch 32 depending on whether it is trying to receive (RX mode) or transmit (TX mode). The network control signal 29 is provided to the transmit mode switch 32 and configures the transmit mode switch 32 to operate in a bidirectional transmit/receive mode. In transmit mode, the DUN transceiver 28 sets the transmit mode switch 32 to TX mode and a home networking signal (MoCA signal) is transmitted from the DHN transceiver 28 through the transmit mode switch 32, control diplexer 34 and band diplexer 16 to an output via the connector 14. In receive mode, the DUN transceiver 28 sets the transmit mode switch 32 to allow the second type of second input signals (home networking signals) separated by the control diplexer 34 to pass through the transmit mode switch 32.

The transmit mode switch 32 provides the second type of second input signal 19 to the receive switch matrix 20. Once received, the switch matrix 20, in response to receive control signal 24, selectively connects the second type of input signal 19 (i.e., home networking signal having a frequency below 950 MHz) to a home network transceiver circuit 28. Thus, the settop box 12, after determining that the signal is a home networking signal, facilitates bidirectional communication between a plurality of settop boxes at a particular location, for example a user's home. The network transceiver 28 may provide the home networking signal to a further settop box based on routing data contained within the signal, for example. Other aspects of a settop box 12 for receiving broadcast signals as well as transmitting and receiving home networking communications, such as user interface and power supply are not shown but are easily understood as necessary for proper operation by one skilled in the art.

In the exemplary embodiment, the home networking communications system 10 used with settop box 12 shown in FIG. 1, is compliant with MoCA. The MoCA system utilizes a half duplex (i.e. only transmit or receive but not both simultaneously) protocol with variable multiple level symbol mapped orthogonal frequency division multiplexing (OFDM) modulation. MoCA may operate in any frequency range supported by transmission on a co-axial cable and the associated connected components such as amplifiers and signal splitters. The MoCA signal may be present in the spectral vicinity of the broadcast signal. However, potential adverse signal conditions created due to the presence of a high signal power level MoCA signal and a weaker signal power level broadcast signal typically require that a frequency spectrum guard band exist between the home networking service and the broadcast signals. The home networking signal being a MoCA-compliant signal is provided for purposes of example only and the system may demodulate any home networking protocol supported by a shared signal delivery medium. Thus, the system is able to adaptively distinguish between two different types of signals without additional costly circuitry even when the frequencies of the signals overlap one another by diplexing and switching during demodulation. It is important to note that the present disclosure may be used with other home networking protocols that operate on a shared signal delivery medium.

Figure 2:
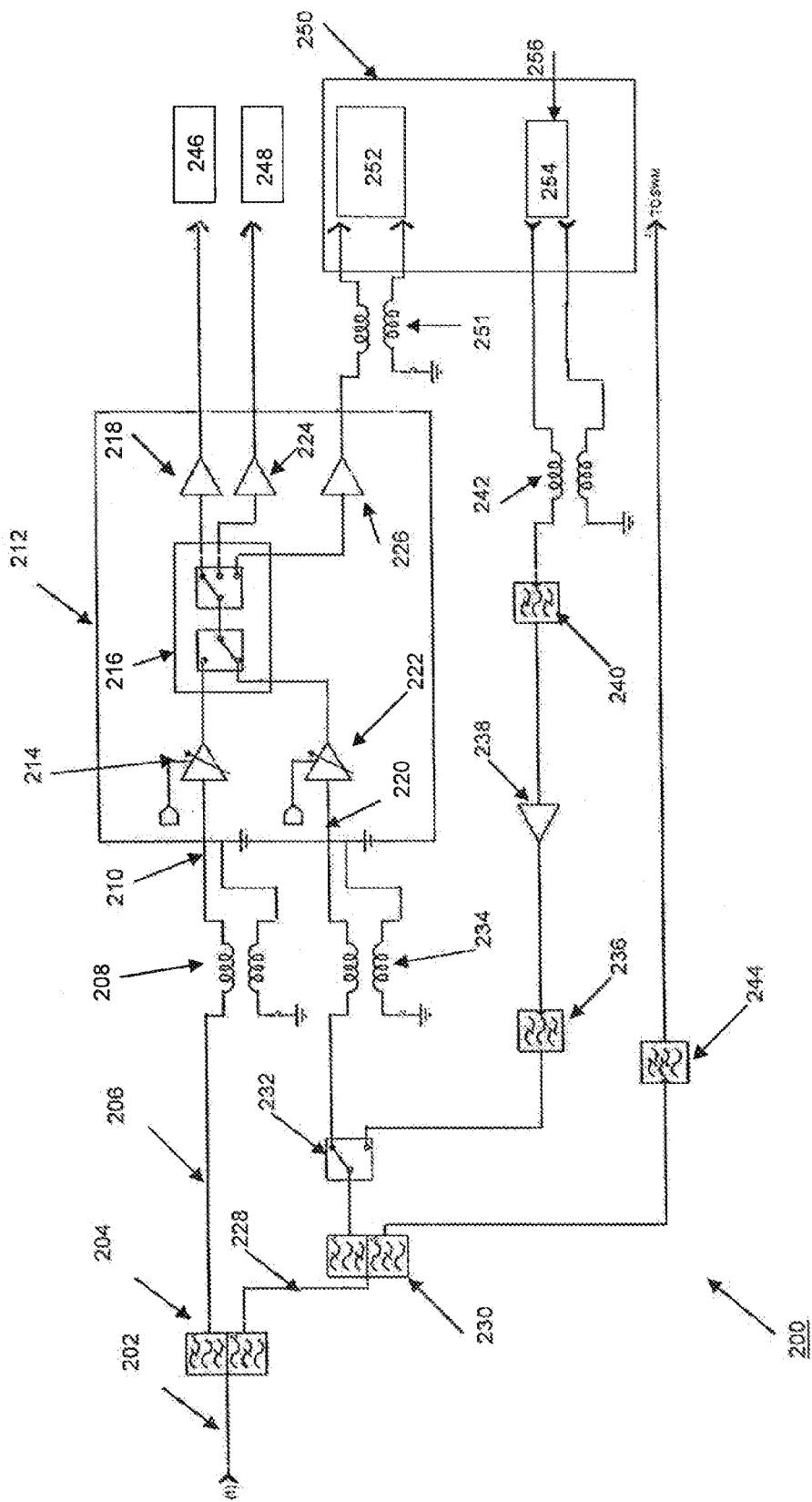
FIG. 2 is a circuit diagram of a home communications and broadcast signal receiving system according to invention principles.

FIG. 2 is a circuit diagram of a combined home communications and broadcast signal receiving system 200. System 200 includes a plurality of circuits used in conventional settop boxes and conditions these circuits to adaptively filter and route two different types of input signals that are transmitted simultaneously as part of a single signal delivery mechanism via an input 202. The circuitry shown herein enables the settop box to reduce the complexity of the receiver resulting in the settop box being produced at a lower cost but improving operational performance. The system 200 may be implemented as part of a satellite settop box capable of receiving signals having a wide range of frequencies whereby the signals contain audio/video content from one or more satellite services using a single coaxial cable input 202. The system 200 includes a diplexer 204 for separating and filtering the input signals according to their respective frequencies. The diplexer 204 is coupled via a first balanced to unbalanced coupler, often referred to as a balun, 208 to a routing circuit 212 for routing the separated signals to the proper output terminals, for example to a tuner or a networking transceiver. The routing circuit 212 includes a first input 210 and a second input 220. The first input 210 is coupled to a first input variable gain amplifier 214 which sets the front end gain and noise figures and which attenuates the signal in the presence of higher input powers. The second input 220 is coupled to a second input variable gain amplifier 214 which sets the front end gain and noise figures and which attenuates the signal in the presence of higher input powers. The first and second inputs 210, 220 are connected to a cross switch 216 that enables any input 210, 220 to independently access any output device which includes any of first tuner 246, second tuner 248 and networking transceiver 250. The routing circuit 212 further includes output buffer amplifiers 218, 224, and 226 which operate in a known manner and are coupled between the cross switch 216 and the respective outputs, 246, 248 and 250. Additionally, a balanced to unbalanced coupler 251 may be coupled between the output buffer amplifier 251 and the network transceiver 250.

The system 200 is also able to engage in bidirectional communication with other similar settop boxes via a home networking protocol. The network transceiver 250 of system 200 includes a networking receiver 254 which receives a DI-IN signal 256, for example a MoCA home networking signal. The DHN signal 256 has a frequency associated therewith that overlaps at least partially, a frequency of one of the input signals received via input 202. The system includes additional circuitry that enables processing of the DHN signal 256 received via the networking receiver 254. The system 200 further includes a coupler 242 connected to a first MoCA transmit filter which filters out the harmonics from the networking receiver 254. A MoCA amplifier 238 is connected to the first MoCA transmit filter 240 and provides the final output gain for the transmitted DHN signal 256. A second MoCA transmit filter 236 is connected to the MOCA amplifier 238 which filters out any remaining harmonics from the receiver 254 and any harmonics generated by the amplifier 238. From the second MoCA transmit filter 236, the DHN signal 256 is provided to a transmission/receiving (TX/RX) switch 232 and to the routing circuit 212. Once received by the routing circuit 212, the DI-IN signal is provided to the networking transceiver 252 for communication to a further settop box on the network. Additionally, once received, DHN signal 256 may be provided to a system controller (not shown) for processing the DHN signal into audio and video data. Conversely, the system controller can also package data from an incoming satellite signal or acquire data from a storage drive and send the data to the DHN transceiver 250 for transmission to other external DHN-equipped devices on the home network (i.e., connected via coaxial cable). The DHN data may be selectively transmitted to other set top boxes with integrated DHN, or non-DHN equipped boxes using a converter such as an Ethernet-coaxial cable-bridge (ECB) that allows a person to connect the DHN signal to a personal computer through Ethernet whereby the user can selectively view digital streaming audio-video data, for example a downloaded movie from a service provider using the settop box.

The settop box shown in FIG. 2 is configured to operate in a first mode whereby the system receives broadcast signals and a second mode whereby the system receives broadcast signals and digital home networking signals. The determination of the mode of operation may be performed in accordance with the mechanisms described in FIGS. 3-5. In a first mode of operation, the input signal 202 from a single coaxial cable is provided to a diplexer 204. The diplexer 204 filters and separates the incoming signal into a portion of spectrum from 950 MHz to 2150 MHz, known as the L-band 206, and a portion of spectrum from 250 MHz to 750 MHz, known as the B band 228. The diplexer 204 operates with 950 to 2150 MHz (L-Band) satellite signals 206 being provided to a first input 210 of the routing circuit 212 and distributed to one or more of a first set of satellite tuner/demodulator circuits 246, 248 as needed. The system 200 further includes a control diplexer 230 coupled between the diplexer 204 and the transmit/receive switch 232. The control diplexer 230 filters control signals between 2.3 MHz, for example MoCA control signal generated via a SWM module and satellite B-band signals operating above 500 MHz. Satellite signals filtered by the diplexer 204 that are in the 250-750 MHz region (B-band) are routed to the second input 220 via the control diplexer 230 and the transmit/receive switch 232. The TX/RX switch 232 is defaulted to allow only B-Band signals 228 to pass through because this is the first mode of operation. The routing circuit 212 distributes the B-Band signal 228 to one or more a second set of the satellite tuner/demodulators 246, 248. It is important to note that the first set and second set of satellite tuner/demodulators may be the same. The first mode of operation is DiseqC mode or non-DHN mode. Non-DHN mode is present when the incoming signals are delivered from multiple sources over a common co-axial cable and no single wire multiplex signaling mode is present.

The second mode of operation is DHN mode whereby the system is able to receive both broadcast signals across the entire spectral range (250 MHz-2150 MHz) and a DHN signal having a frequency that partially overlaps a portion of the broadcast signal frequency range (500 MHz and 600 MHz). In a second mode of operation, a SWM module (not shown) provides an FSK control signal which is filtered by a SWM filter 244. The SWM filter is a narrow bandpass filter and filters signals having a frequency below 2.3 MHz. In this second mode of operation, DHN signal 256 is received by networking receiver 254. Because the DHN signal 256 has a frequency ranging between 500 MHz and 600 MHz, the satellite signals used by system 200 are remixed and have frequencies that are between 950 MHz and 2150 MHz. In this mode, the networking transceiver 250 (or alternatively, the SWM module) configures the TX/RX switch 232 to toggle between a first position enabling passage of B-band satellite signals and a second position enabling passage of the DHN signal 256. The TX/RX switch 232 needed for DHN signal transmission is placed in front of the routing IC 212 to allow a tap-in point for the DHN transmission path. In the second position, the TX/RX switch passes the DHN signal 256 to the second input 220 of the routing circuit 212. Upon receipt of the signal 256 by the routing circuit 212, the cross switch 216 automatically associates the second input 220 with the output associated with the DHN transceiver 250 and DI-IN signal 256 is provided to the transmitter 252 of the networking transceiver 250.

The cross switch 216 selectively routes all of the input signals, whether they are broadcast signals or DHN signals, to the proper output devices. In the first mode of operation, the L-Band signal 228 is routed by the switch to any of the tuners 246 and/or 248. Additionally, the B-Band signals routed via the second input 220 are also routed by the cross switch 216 to any of the tuners 246 or 248, as needed. In this mode, the cross switch will prevent access to the networking transceiver 250 and the TX/RX switch 232 is locked in receive mode allowing B-Band signals to pass through to the second input 220. In the second mode of operation, all broadcast signals are above the threshold frequency of 950 MHz and are provided to the first input 210. Cross switch 216 selectively toggles between the tuners 246 and 248, as needed and the satellite signals are provided thereto. Additionally, in the second mode of operation, the cross switch 216 automatically routes signals received at the second input 220 to the network transceiver 250 because there are no B-band signals filtered by diplexer 204. The TX/RX switch 232 is selectively toggled between the transmit mode and receive mode as needed enabling transmission and reception of home networking signals. The mode of operation is set prior to system operation in the manner discussed below with respect to FIGS. 3A-3C. Operational modes may be changed during a new installation or during upgrade of an existing installation.

The system advantageously makes use of the second input on a routing circuit 212 for reception of either the B-band signal or the DHN signal 256 when present. The TX/RX switch 232 further provides a transmission for DHN signal 256 for output via the connector 202. This second mode of operation providing a transmission path for the DHN signal 256 is advantageously employed when the incoming signals are delivered from multiple sources over a common co-axial cable using DiseqC signaling mode, for example.

The architecture of the system 200 advantageously reduces the complexity of the device by eliminating two switches, a received signal amplifier and a signal attenuator while also preserving the benefits of the diplexed arrangement for operation in non-DHN modes. The arrangement may also lower the additional filtering and signal separation necessary for proper operation of the satellite broadcast receiver circuits for both L-band and B-hand. The system beneficially uses a diplexer 204 to split B-band and L-band signals and enables use of the inputs 210 and 220 to route desired signals to the tuners 246 and 248. Without this diplexer 204, to make use of the two inputs of 212, a system would need two switches for satellite signals. The first switch would take the place of the diplexer 204. However, this presents a certain difficulty in that a 250 MHz high pass filter on one leg of the switch that provides a good input voltage standing wave ratio (VSWR) from 250-2150 MHz for non DiseqC modes is technically complex and costly. Additionally, the other leg of the switch would have to also include a diplexer that has a steep cutoff because it would be a SWM-mode diplexer. Furthermore, the system would require another switch behind these filters for switching between the L-Band and B-Band satellite signals. The system 200 shown in FIG. 2 remedies these drawbacks by providing the diplexer 204 and TX/RX switch to enable use of the second input 220 on the routing circuit 212 for both broadcast signals and home networking signals.

Figure 3:
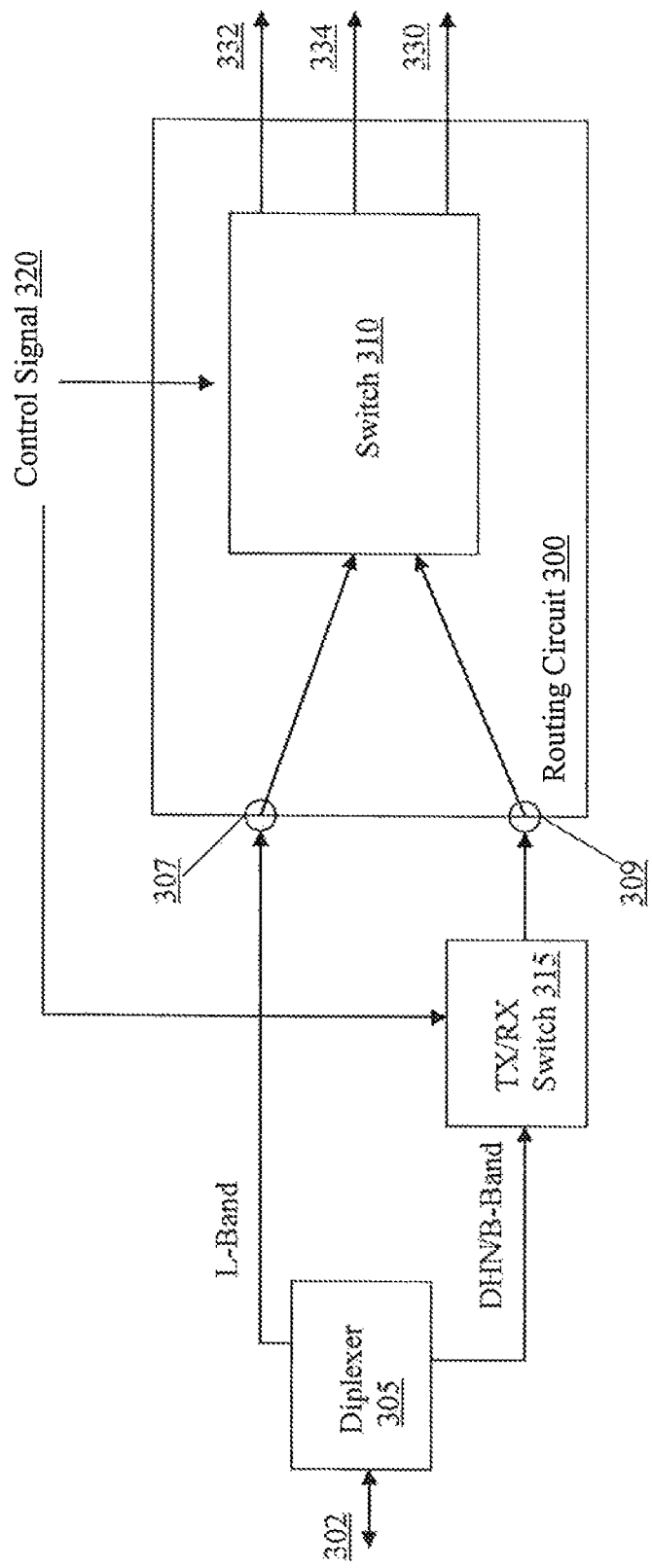
FIG. 3 is a block diagram an of exemplary switching control mechanism incorporated within the home communications and broadcast receiving system according to invention principles.
Figure 4:
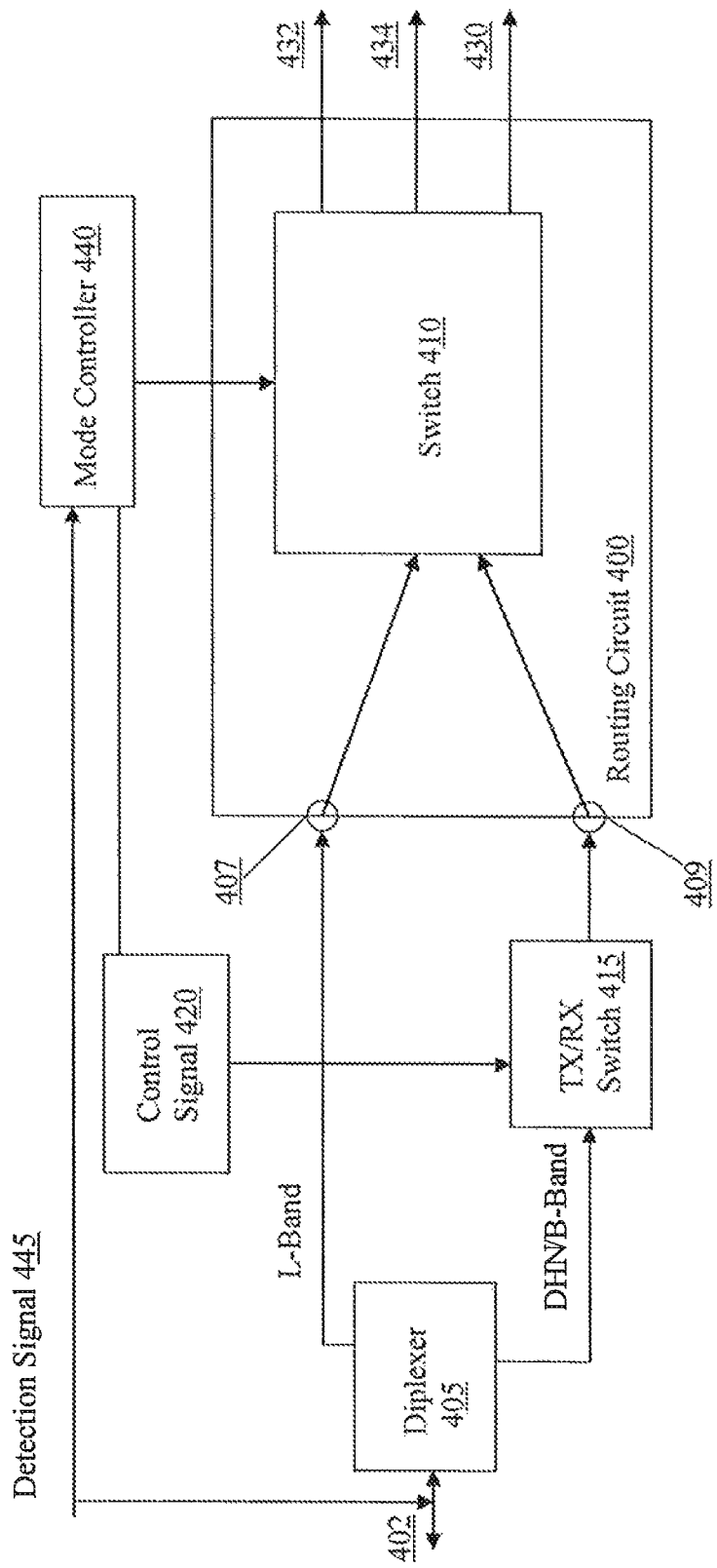
FIG. 4 is another block diagram an of exemplary switching control mechanism incorporated within the home communications and broadcast receiving system according to invention principles.
Figure 5:
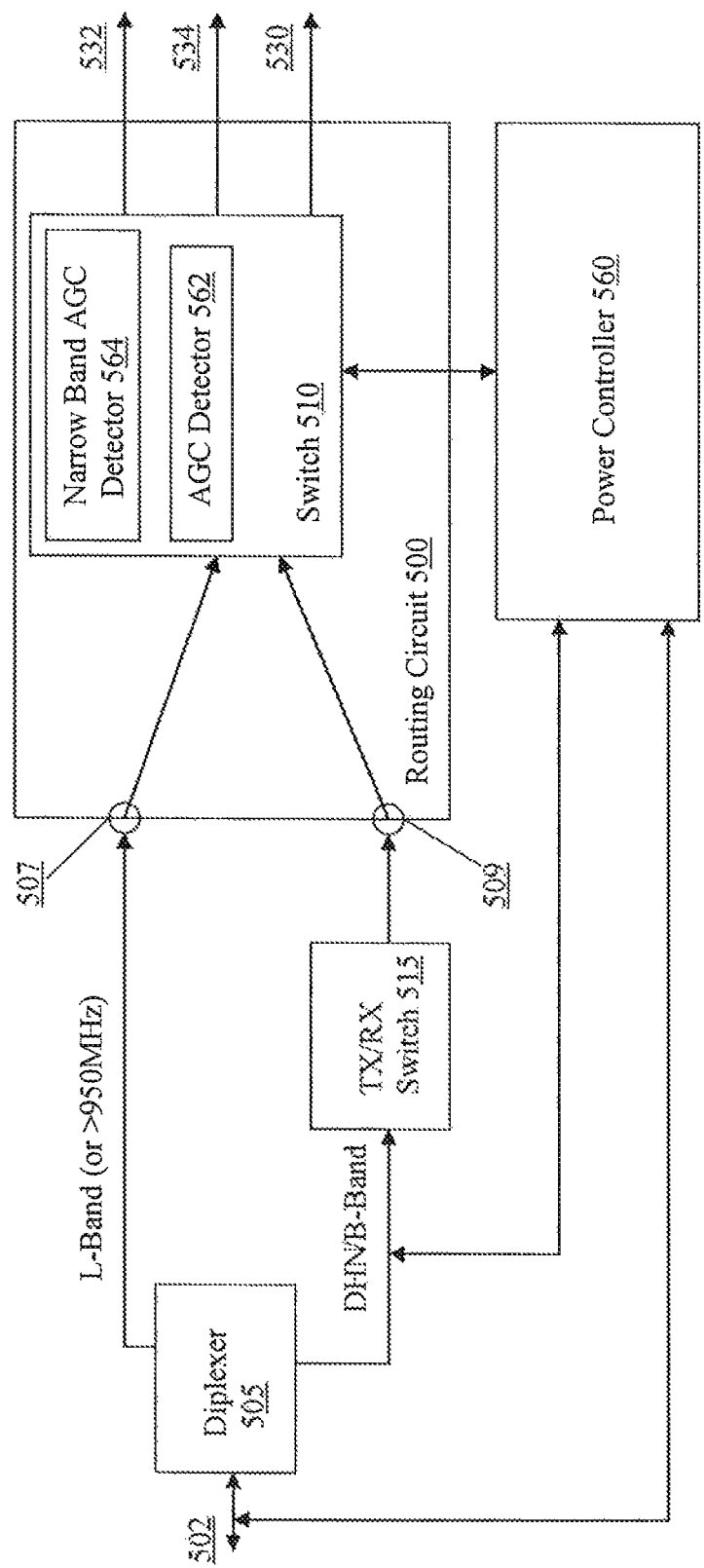
FIG. 5 is yet another block diagram an of exemplary switching control mechanism incorporated within the home communications and broadcast receiving system according to invention principles.

FIGS. 3-5 represent exemplary mechanism for controlling the switch operation with the routing circuit. The control mechanism enables the system to maximize the availability of the inputs for use by a plurality of different types of digital data signals even when two of the signals routed through the switch have overlapping frequencies. In exemplary operation, a control processor parses configuration data in order to condition switch operation. As used herein, the term processor is hardware that is conditioned to operate by a set of logical instructions encoded thereon directing the operation of other circuits within the system. The configuration data used by the system may include at least one of predetermined configuration data including information that conditions the system to provide a first signal type within a first frequency range to a first input of the routing circuit. Configuration data further includes information that conditions the system to provide a first signal type within a different frequency range to a second input and a second signal type within the second frequency range to the second input. This advantageously enables the system to use two existing inputs to provide two different signal types for demodulation even when there is an overlapping frequency range associated therewith. FIGS. 3-5 describe exemplary control mechanisms and the configuration data used to condition system operation.

FIG. 3 is a block diagram of a system that employs predetermined configuration data for use in controlling the switch in the routing circuit. For example, during initial setup of the settop box, an installer sets the configuration data to include information that the settop box is to operate in a SWM mode. The configuration data is provided by a system controller (not shown) as a control signal 320 to a TX/RX switch 315 and routing switch 310 which uses the information within the control signal 320 to direct the path of transmission to the desired demodulator (i.e. tuner or networking transceiver). This mechanism is described above in FIG. 2. In SWM mode, the settop box is able to receive a plurality of input signals, including satellite and DHN signals, at a common input 302. In SWM mode, the satellite signals received encompass signals having frequencies ranging between 250 MHz and 2150 MHz. However, the SWM module remixes the signals, as needed, such that all satellite signals are above the 950 MHz threshold frequency. This signal is filtered and separated by diplexer 305 into a first input signal of a first type (broadcast signal) having a frequency greater than a threshold frequency and a second input signal of either a first type or second type (DHN signal) having a frequency below the threshold frequency. The first input signal of the first type may be a cable/satellite signal in the L-Band frequency range that is provided, as discussed above with respect to FIGS. 1 and 2, to a first input 307 on the routing circuit 300. The control signal 320 is provided to the TX/RX switch 315. Based on the information in the control signal 320 identifying the second input signal being the second type (i.e. DHN signal), the TX/RX switch IC 315 is configured to operate in a TX/RX mode enabling transmission of MoCA DIN signal to a second input 309 of the routing circuit 300. The control signal 320 is also received by the routing switch 310 which enables the routing circuit 300 of the settop box to route the incoming second input signal to be provided to a DHN receiver 330 for demodulation.

Alternatively, the control signal 320 may include information directing the settop box to operate in traditional DiseqC mode whereby the incoming signal is diplexed by diplexer 305 into L-Band and B-Band signals. The L-Band signal is received at the first input 307. In DiseqC mode, the information in the control signal 320 provided to the TX/RX switch 315 configures the switch to operate in a RX mode and receives the B-Band from diplexer 305. The TX/RX switch 315 provides the B-Band signal at the second input 309. The control signal 320 further configures the routing switch 310 to provide the L-Band signal to a first tuner 332 and the B-Band signal to a second tuner 334. It should be noted that the signal transmission path described above is provided for example only and the control signal 320 may direct the any of the L-Band and B-Band signals to at least one of any of the tuners 332 or 334, the same tuner, and a further demodulator circuit (not shown).

FIG. 4 illustrates another control mechanism that may be implemented by the system to selectively determine the signal transmission path for a plurality of different type of input signals. The control mechanism enables the adaptive switching between operation modes such that the settop box can switch modes of operation at a given time based on the content of the input signal received. In this embodiment, a mode controller 340 is provided and employs a "smart" algorithm for automatically detecting the composition of the signal. In operation, the mode controller 440 generates a detection signal 445 which polls the contents of the input signal being received at input connector 402. This may be performed, for example, by polling the coaxial cable for presence of a SWM-equipped outdoor unit present at a particular location. If the signal 445 returned to the mode controller 440 does not return a result, i.e. the test is false, then the mode controller 440 determines that the settop box should operate in DiseqC mode. In DiseqC mode, the diplexer 405 filters and separates the input signal into a first input signal of a first type (L-Band satellite signal having a frequency ranging between 950 MHz and 2150 MHz) and a second input signal of a first type (B-Band satellite signal having a frequency ranging between 250 MHz and 950 MHz). The mode controller 440 configures the routing switch 410 for passing the L-Band and B-Band signals to respective tuners 432, 434 for demodulation. In this mode, the L-Band signal is provided at the first input 407 of the routing circuit 400 and the B-Band signal is provided at the second input 409 of the routing circuit. The mode controller 440 configures the routing switch 410 to toggle between the first tuner 432 and the second tuner 434 to provide a signal transmission path to the desired tuner for demodulation. In this mode, the settop box would not implement the DUN mode which remains shut down.

Alternatively, if the result of the test performed by the mode controller 440 returns a true value via detection signal 445, the mode controller 440 generates the control signal 420 which is provided to the TX/RX switch 415. Control signal 420 configures the TX/RX switch 415 to operate in a transmit/receive mode for receiving a second input signal of a second type (i.e. a DHN signal having a frequency below 950 MHz and between 500 MHz-600 MHz). The DHN signal is provided to the routing circuit 400 via the second input 409. The mode controller 440 configures the routing switch 410 to route the DHN signal to the home network transceiver 430 for demodulation. Also, in this mode, the mode controller 440 configures the routing switch to route the L-Band signal received via the first input 407 of the routing circuit 400 to one of the tuners 432 or 434 for demodulation.

FIG. 5 is yet another embodiment of a control mechanism that may be implemented by the system. This control mechanism utilizes a power controller 560 connected to the routing circuit 500 for detecting an amount of power of the second input signal in order to configure the operation of a TX/RX switch 515. The power controller 560 being shown as a separate and distinct circuit is provided for exemplary purposes only and one skilled in the art recognizes that the features and operation of the power controller 560 may be incorporated as part of a system controller circuit as discussed in FIG. 1. The switch 510 includes an AGC (automatic gain control) Detector 562 for detecting the amount of power present at signals within a first frequency range, i.e. 250 MHz and 950 MHz at the first input 507 and second input 509 of the routing circuit 500. The switch 510 further includes a narrow band AGC detector 564 for detecting an amount of power present at signals within a narrower frequency range, i.e. 500 MHz and 600 MHz at the first input 507 and second input 509. In operation, the power controller 560 senses an amount of power present at the input connector 502. The input signal is filtered and separated by diplexer 505 into a first input signal having a frequency ranging between 950 MHz and 2150 MHz (L-Band signal) and a second input signal having a frequency ranging between 250 MHz and 950 MHz (i.e. B-Band or DHN signal). Upon sensing that power is present at the second input 509, the narrow band AGC detector 564 senses the presence of power at frequencies outside of the DHN band (500-600 MHz). These detectors measure, or detect, all of the power present at their respective inputs, but because of the diplexer 505 filters and separates the original input signal, the detection by the detectors 562, 564 at the second input 509 determines if any power is present below 950 MHz. A second AGC detection estimate is available using AGC detectors inside the tuners 532, 534 (not shown). Each tuner has an AGC detector with a pickoff point that is downstream from the narrower band-limiting filters needed by the tuner to tune a particular frequency. The AGC detectors in the tuners sense the power available in that particular narrow bandwidth. For example, if a tuner is tuned receive a satellite signal at 1100 MHz, the AGC detector is going to see power within a frequency ranging between 1090 MHz and 1110 MHz, depending on how narrow the tuner filters are set.

In response to a report, or indication, that power is present outside the DI-IN frequency range, the settop box will default to operate in DiseqC mode thus facilitating passage of L-Band signal to the first input 507 and B-Band signal to the second input 509 of the routing circuit 500. The power controller 560 directs the routing switch 510 to route the L-Band and B-Band signals, received via the first and second inputs 507, 509, to the desired tuner/demodulator 532, 534.

In response to a report, or indication, that power is not present at signals outside of the DHN band, but the narrowband AOC detector 564 senses power within the DHN band frequency range, then power controller 560 generates and transmits a SWM polling signal which is sent out to verify the presence of a SWM so that DHN mode can be enabled. The SWM polling signal is provided by the power controller 560 to the external reception equipment (not shown) via the connector 502. The power controller 560 generates and receives communication messages to and from the external SWM device (SWM's communication mode is a bidirectional FSK at 2.3 MHz). The controller transmits FSK polling messages that go out on the coaxial cable and if there is a SWM "master" on the coaxial cable (like a dish), it xviii respond and begin sending the set top "registration" information which is used to configure the operation of the switch 510 within the routing circuit.

Once enabled to operate in DHN mode, the satellite signals are remixed as necessary such that the signals have frequencies greater than the threshold frequency of 950 MHz. The satellite signals are separated by diplexer 505 and provided at the first input 507 of the routing circuit 500. The routing switch 510 passes these signals to at least one of the tuners 532, 534 for demodulation. Additionally, the TX/RX switch 515 is configured, in response to a configuration signal provided by the power controller 560, to operate in a transmit/receive mode enabling DHN signal transmission and the DI-IN signal is provided at the second input 509 of the routing circuit. The power controller 560 configures the routing switch 510 to route the DHN signal to a networking transceiver 530.

Figure 6:
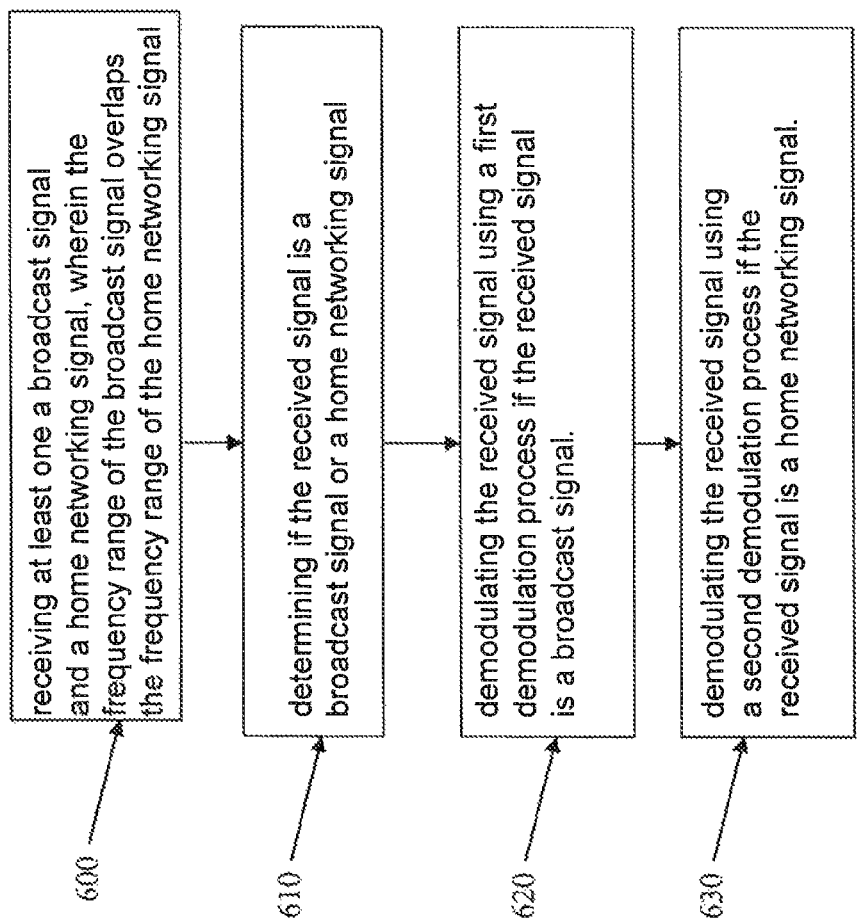
FIG. 6 is a flow diagram detailing the operation of the home communications and broadcast receiving system according to invention principles.

An exemplary method of system operation is provided in FIG. 6. At step 600, the settop box receives at least one of a broadcast signal and a home networking signal at a common input wherein the frequency range of the broadcast signal overlaps the frequency range of the home networking signal. As used herein a broadcast signal is a digital data signal used for transmitting audio/visual or other data by a cable or satellite provider, for example. The system adaptively determines, in step 610, if the received signal is a broadcast signal or a home networking signal. This determination is made by diplexing the received signal into components that are above and below a threshold frequency, for example 950 MHz. Any signal separated by the diplexer that is above the threshold frequency is determined to be a broadcast signal and is provided to a first input of a routing circuit of the settop box which assigns the broadcast signal to a particular signal transmission path. Once assigned, in step 620, the broadcast signal is demodulated using a first demodulation process. The first demodulation process may include, for example, tuning to a frequency in response to user selection of a particular content channel. For example, the broadcast signal is provided to a tuner for demodulation and output to a display device in a known manner. Any signal separated by the diplexer that is below the threshold frequency is determined to be a home networking signal and is provided to a second input of a routing circuit of the settop box which assigns the home networking signal to a different signal transmission path. Once assigned to the second signal transmission path, the home networking signal is provided for demodulation using a second demodulation process in step 630. The second demodulation process may include, for example, processing of a digital home networking signal in a known manner. For example, the home networking signal is provided to a networking transceiver for demodulation and communication to further settop boxes on the network. This method makes use of the two inputs of the routing circuit for receiving three different types of input signals where only two were previously able to be received. Thus, the settop box operating in according with the above method is structurally less complex and costs less to produce.

Figure 7:
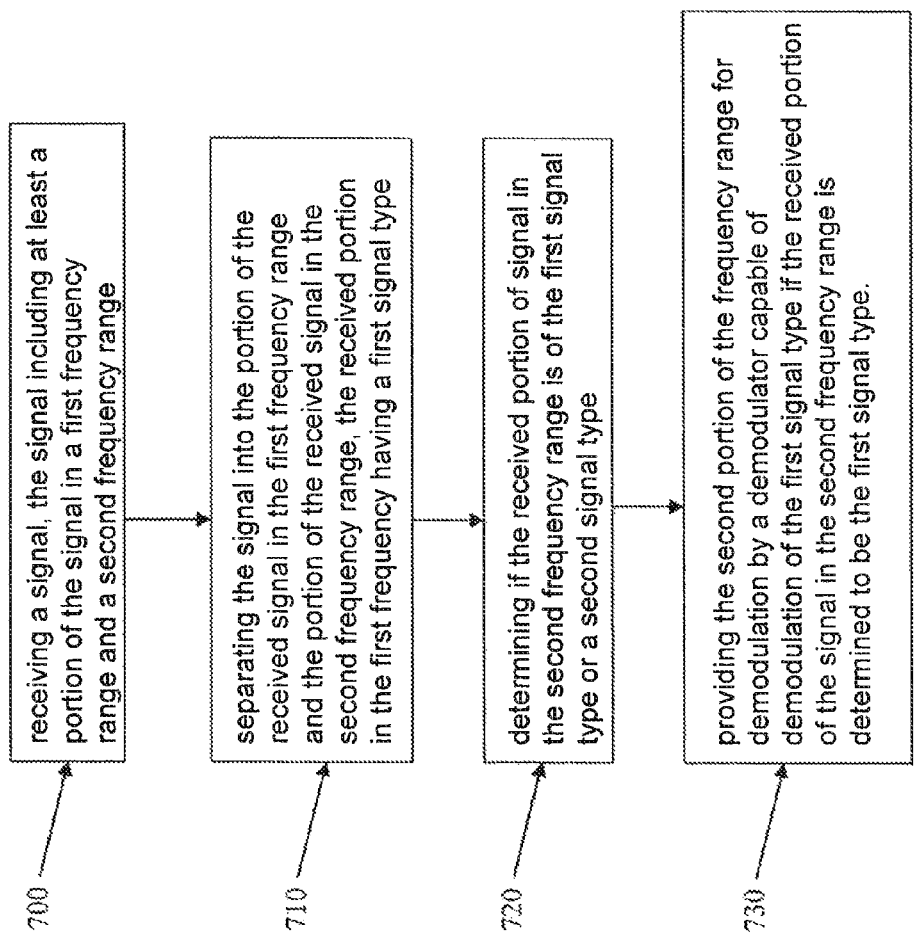
FIG. 7 is a flow diagram detailing the operation of the home communications and broadcast receiving system according to invention principles.

Another exemplary mode of operation is provided in FIG. 7. At step 700, the settop box receives a signal at common signal input. The received input signal spans a first frequency range and a second frequency range. The received signal is separated according to frequency in step 710. A portion of the received signal in the first frequency range is provided as a first input signal and a portion of the received signal in the second frequency range is provided as a second input signal. The first input signal in the first frequency range is a first signal type. For example, a diplexer separates the signals based on a threshold frequency and assigns the signal having the frequency above the threshold value as the first input signal type (i.e. L-Band). In step 720, it is determined if the received portion of signal in the second frequency range is of the first signal type or a second signal type. This determination may be made, as discussed in accordance with the description of FIG. 6 whereby the system senses the power associated with the signal to determine the mode of operation. For example, the second input signal in the second frequency range is polled to determine if power is present outside a particular frequency range (i.e. below 500 MHz and above 600 MHz) and within a particular frequency range (i.e. between 500 MHz and 600 MHz). If power is sensed, or detected, in at least one of a frequency range above and below the particular frequency range, the second input signal is determined to be of the first type (i.e. a B-Band signal). If, however, no power is detected outside the particular frequency range but power is sensed within the particular frequency range, then the second input signal is determined to be of a second signal type, i.e. a DHN signal. Upon determining the nature of the separated signals, at step 730, the second portion of the frequency range is provided for demodulation by a demodulator capable of demodulating the first signal type if the received portion of the signal in the second frequency range is determined to be the first signal type. Alternatively, if the second portion of the frequency range is determined to be of a second signal type, the routing circuit provides a second portion of the frequency range that is of a second type to a demodulator capable of demodulating the second signal type if the received portion of the signal in the second frequency range is determined to be the second signal type. While the operation discussed in FIG. 7 describes using the mechanism set forth in FIG. 5, one skilled in the art can readily adapt the control mechanism to be in accordance with any of FIGS. 3 and/or 4.

As described above, the system is capable of receiving broadcast type signals, such as signals delivered over a satellite network, as well as home network signals, such as those delivered over MoCA. The system may operate in one of two modes. The receiver first determines, through inputs from the user or through a determination made by a microprocessor in the settop box, if the current operation is not a single wire multiplex mode that will utilize the B-band frequency range if the settop box determines that B-band is used, then home networking operations are disabled and the network switch shown in FIGS. 1 and 2 is connected so that the input signal from the input diplexer is connected through to a satellite tuner/demodulator circuit. However, if the settop box determines that B band is not used, then home networking operations are enabled and the network switch shown in FIGS. 1 and 2 is connected so that the input signal from the input diplexer is connected through to the home networking transceiver. It is important to note that the user may also control whether home networking operations are available even if B-band broadcast signals are not used. Further, the determination of operation for B-band use may be made at initial settop box configuration or may be continually updated. For instance, the availability of home networking operation may be determined each time a new program or channel is selected by a user in this manner, home networking operation may be only interrupted rather than completely eliminated from use based on the presence of B band signals in some instances.

While the embodiments may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the scope of the disclosure as defined by the following appended claims

The invention claimed is:

1. A method comprising the steps of:
receiving at least one of a broadcast signal and a home networking signal, wherein the frequency range of the broadcast signal overlaps the frequency range of the home networking signal; and
determining if the received signal is a broadcast signal or a home networking signal, the step of determining including:
receiving configuration data;
identifying a mode of operation in response to the configuration data;
conditioning a switch to pass the broadcast signal to an input of a routing circuit for demodulation using a first demodulation process in a first mode of operation, the first demodulation process including the step of tuning a signal having a frequency range equal to or greater than a threshold frequency; and
conditioning a switch to pass the home networking signal to said input of said routing circuit for demodulation using a second demodulation process in a second mode of operation.

2. The method as recited in claim 1, wherein the switch enables bidirectional communication in the second mode of operation.

3. A method comprising the steps of:
receiving a signal, the signal having a first frequency range and a second frequency range;
separating the received signal into a first portion in the first frequency range and a second portion in the second frequency range, the received first portion in the first frequency being a first signal type;
determining if the second portion of the received signal is of the first signal type or a second signal type; and
demodulating the second portion of the received signal using a first signal type demodulator if the second portion of the received signal is determined to be of the first signal type.

4. The method of claim 3, further comprising the step of:
demodulating the second portion of the received signal using a second signal type demodulator if the second portion of the received signal is determined to be of the second signal type.

5. The method of claim 3, wherein said first type of signal is a broadcast signal and said second type of signal is a home networking signal.

6. The method of claim 3, wherein the step of determining further comprises
polling the signal prior to receipt at an input connector to identify the second portion of the received signal as a signal of the first signal type or the second signal type.

7. The method of claim 3, wherein the step of determining further comprises providing a sub-frequency range within said second frequency range,
said sub-frequency range being associated with said second type of signal;
sensing power present at frequency ranges above and below said sub-frequency range;
determining that the second portion of the received signal is of a first signal type if power is sensed in at least one of above and below the sub-frequency range; and
determining that the second portion of the received signal is of a second signal type if power is sensed within the sub-frequency range.

8. The method as recited in claim 7, further comprising:
demodulating the second portion of the received signal using a second signal type demodulator if the second portion of the received signal is determined to be of the second signal type.

9. The method as recited in claim 8, wherein the second signal type is a home networking signal and the second signal type demodulator is a home networking transceiver.

10. The method as recited in claim 3, wherein the first signal type is a broadcast signal and the first signal type demodulator includes a broadcast signal tuner.

11. An apparatus comprising:
a diplexer that receives a signal and filters the signal to produce a portion of the received signal in a first frequency range and a portion of the received signal in a second frequency range;
a switching circuit coupled to the diplexer that receives the portion of the received signal in the second frequency range;

a controller coupled to the output of the switching circuit that determines whether the portion of the signal in the second frequency range is of a first signal type or a second signal type; and at least one demodulator coupled to the switching circuit that receives the portion of the received signal in the second frequency range signal for demodulation based on whether the portion of the received signal in the second frequency range is of a first signal type or a second signal type.

12. The apparatus as recited in claim 11, wherein the first signal type is a broadcast signal and the second signal type is a home networking signal, and further comprising:

at least one tuner for tuning the broadcast signals; and a networking transceiver for demodulating the home networking signal.

13. The apparatus as recited in claim 11, wherein the controller uses predetermined configuration information provided during initial setup of the apparatus to determine if the portion of the signal in the second frequency range is the first signal type or the second signal type.

14. The apparatus as recited in claim 11, wherein the controller further comprises at least one power detector for detecting if power is present at least one of above a predetermined frequency range, below a predetermined frequency range, and within a predetermined frequency range, and wherein the controller determines that the portion of the signal in the second frequency range is a first signal type if power is present in at least one of above and below the predetermined frequency range or a second signal type if power is present within the predetermined frequency range.

15. The apparatus as recited in claim 14, wherein the controller configures the switching circuit to provide the second portion of the received signal to a network transceiver demodulator.

16. An apparatus comprising:

means for receiving at least one of a broadcast signal and a home networking signal, wherein the frequency range of the broadcast signal overlaps the frequency range of the home networking signal; and means for determining if the received signal is a broadcast signal or a home networking signal, the means for determining further including:

means for receiving configuration data;

means for identifying a mode of operation in response to the configuration data;

means for conditioning a switch to pass the broadcast signal to an input of a routing circuit for demodulation using a first demodulation process in a first mode of operation, the first demodulation process including a means for tuning a signal having a frequency range equal to or greater than a threshold frequency; and means for conditioning a switch to pass the home networking signal to said input of said routing circuit for demodulation using a second demodulation process in a second mode of operation.

17. The apparatus as recited in claim 16, wherein the switch enables bidirectional communication in the second mode of operation.

18. A method comprising the steps of:

receiving at least one of a broadcast signal and a home networking signal, wherein the frequency range of the broadcast signal overlaps the frequency range of the home networking signal; and determining if the received signal is a broadcast signal or a home networking signal, the step of determining including:

receiving configuration data;

identifying a mode of operation in response to the configuration data;

conditioning a switch to pass the broadcast signal to an input of a routing circuit for demodulation using a first demodulation process in a first mode of operation; and conditioning a switch to pass the home networking signal to said input of said routing circuit for demodulation using a second demodulation process in a second mode of operation, the second demodulation process being performed by a home network transceiver on a signal having a frequency range less than a threshold frequency.

19. An apparatus comprising:

means for receiving at least one of a broadcast signal and a home networking signal, wherein the frequency range of the broadcast signal overlaps the frequency range of the home networking signal; and means for determining if the received signal is a broadcast signal or a home networking signal, the means for determining further including:

means for receiving configuration data;

means for identifying a mode of operation in response to the configuration data;

means for conditioning a switch to pass the broadcast signal to an input of a routing circuit for demodulation using a first demodulation process in a first mode of operation; and means for conditioning a switch to pass the home networking signal to said input of said routing circuit for demodulation using a second demodulation process in a second mode of operation, the second demodulation process being performed by a home network transceiver on a signal having a frequency range less than a threshold frequency.

20. A method comprising the steps of:

receiving at least one of a broadcast signal and a home networking signal, wherein the frequency range of the broadcast signal overlaps the frequency range of the home networking signal; and determining a mode of operation;

providing the received signal to an input of a routing circuit for demodulation using a demodulation process for the broadcast signal if it is determined that the mode of operation is a first mode of operation, the demodulation process for the broadcast signal including tuning a signal having a frequency range equal to or greater than a threshold frequency; and providing the received signal to said input of said routing circuit for demodulation using a demodulation process for the home networking signal if it is determined that the mode of operation is a second mode of operation.

21. A method comprising the steps of:

receiving at least one of a broadcast signal and a home networking signal, wherein the frequency range of the broadcast signal overlaps the frequency range of the home networking signal; and determining a mode of operation;

providing the received signal to an input of a routing circuit for demodulation using a demodulation process for the broadcast signal if it is determined that the mode of operation is a first mode of operation; and providing the received signal to said input of said routing circuit for demodulation using a demodulation process for the home networking signal if it is determined that the mode of operation is a second mode of operation, the demodulation process for the home networking signal being performed by a home network transceiver on a signal having a frequency range less than a threshold frequency.

22. An apparatus comprising:

means for receiving at least one of a broadcast signal and a home networking signal, wherein the frequency range of the broadcast signal overlaps the frequency range of the home networking signal; and means for determining a mode of operation;

means for providing the received signal to an input of a routing circuit for demodulation using a demodulation process for the broadcast signal if it is determined that the mode of operation is a first mode of operation, the demodulation process for the broadcast signal including means for tuning a signal having a frequency range equal to or greater than a threshold frequency; and means for providing the received signal to said input of said routing circuit for demodulation using a demodulation process for the home networking signal if it is determined that the mode of operation is a second mode of operation.

23. A method comprising the steps of:

means for receiving at least one of a broadcast signal and a home networking signal, wherein the frequency range of the broadcast signal overlaps the frequency range of the home networking signal; and means for determining a mode of operation;

means for providing the received signal to an input of a routing circuit for demodulation using a demodulation process for the broadcast signal if it is determined that the mode of operation is a first mode of operation; and means for providing the received signal to said input of said routing circuit for demodulation using a demodulation process for the home networking signal if it is determined that the mode of operation is a second mode of operation, the demodulation process for the home networking signal being performed by a home network transceiver on a signal having a frequency range less than a threshold frequency.

* * * * *